Aug. 9, 1932. H. A. DENMIRE 1,871,119
FABRIC MEASURING AND CUTTING DEVICE FOR BEAD FLIPPER MACHINES
Filed Feb. 11, 1929 9 Sheets-Sheet 1

INVENTOR
Harold A. Denmire
BY
Evans + McCoy
ATTORNEYS

Aug. 9, 1932.    H. A. DENMIRE    1,871,119
FABRIC MEASURING AND CUTTING DEVICE FOR BEAD FLIPPER MACHINES
Filed Feb. 11, 1929    9 Sheets-Sheet 3

INVENTOR
Harold A. Denmire
BY
Evans & McCoy
ATTORNEYS

Aug. 9, 1932.   H. A. DENMIRE   1,871,119
FABRIC MEASURING AND CUTTING DEVICE FOR BEAD FLIPPER MACHINES
Filed Feb. 11, 1929   9 Sheets-Sheet 4
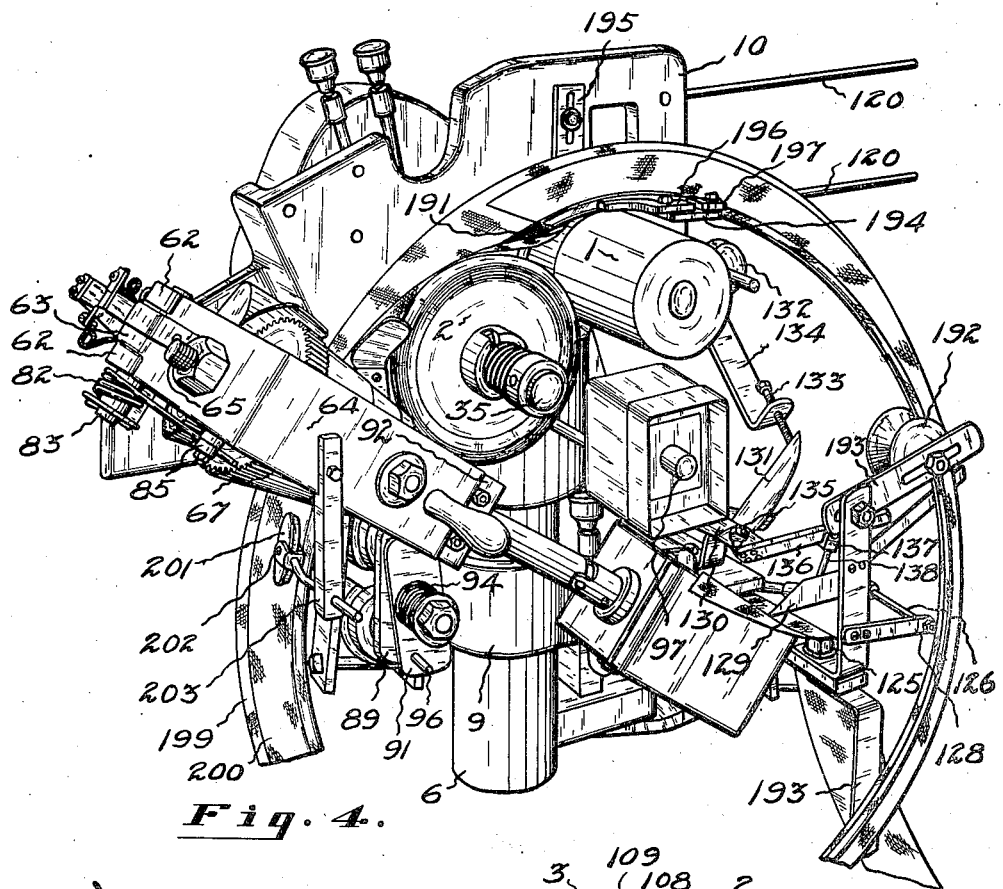
INVENTOR
Harold A. Denmire
BY
Evans + McCoy
ATTORNEYS Aug. 9, 1932.   H. A. DENMIRE   1,871,119
FABRIC MEASURING AND CUTTING DEVICE FOR BEAD FLIPPER MACHINES
Filed Feb. 11, 1929   9 Sheets-Sheet 6
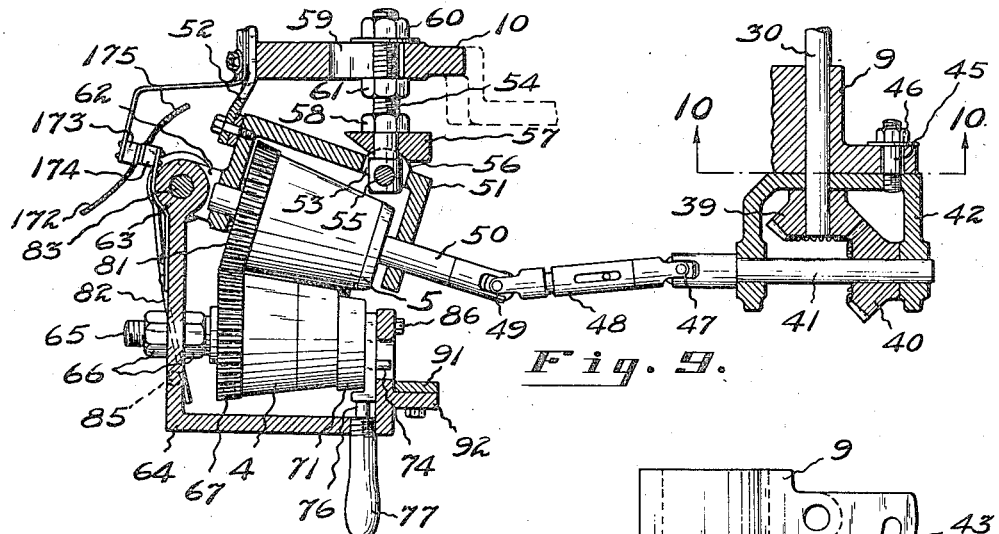
INVENTOR
Harold A. Denmire
BY
Evans & McCoy
ATTORNEYS Aug. 9, 1932.   H. A. DENMIRE   1,871,119
FABRIC MEASURING AND CUTTING DEVICE FOR BEAD FLIPPER MACHINES
Filed Feb. 11, 1929   9 Sheets-Sheet 7
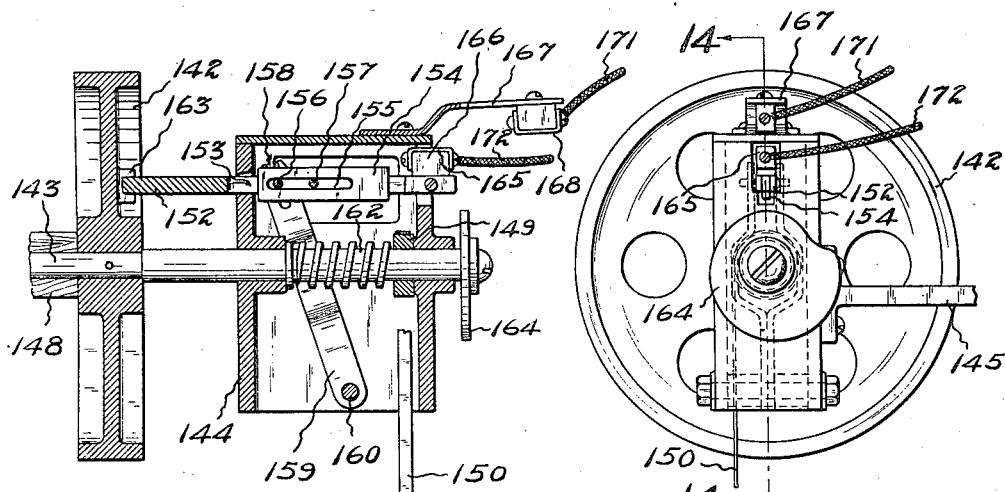
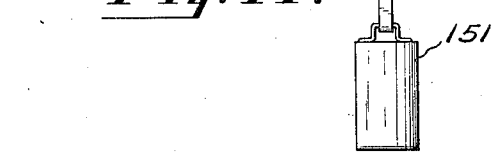
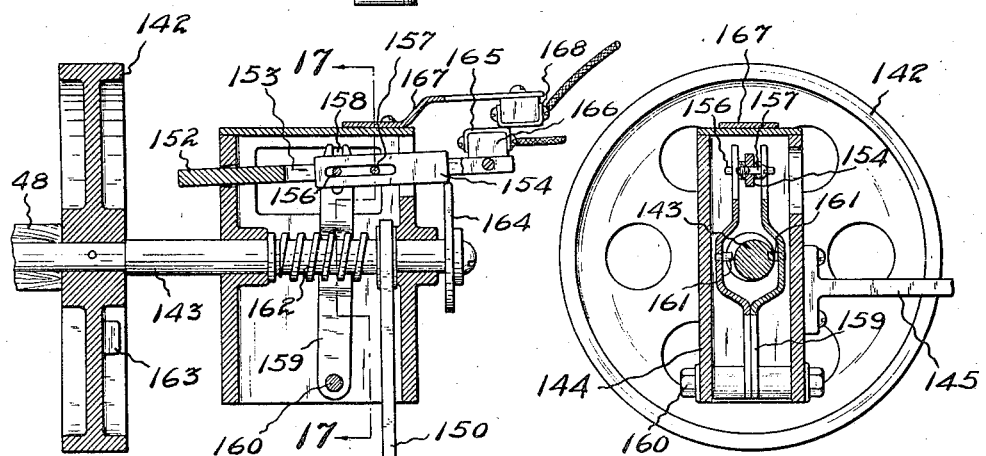
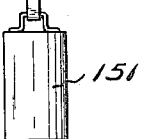
INVENTOR
Harold A. Denmire
BY
Evans & McCoy
ATTORNEYS Patented Aug. 9, 1932

1,871,119

UNITED STATES PATENT OFFICE

HAROLD A. DENMIRE, OF AKRON, OHIO, ASSIGNOR TO THE GENERAL TIRE & RUBBER COMPANY, OF AKRON, OHIO, A CORPORATION OF OHIO

FABRIC MEASURING AND CUTTING DEVICE FOR BEAD FLIPPER MACHINES

Application filed February 11, 1929. Serial No. 339,022.

This invention relates to apparatus for applying flipper strips to beads for vehicle tires and the like and is directed in particular to means for measuring and cutting the flipper fabric to the desired length during the operation of forming the bead flipper.

One of the objects of the present invention is to provide mechanism for bead flipper forming machines which automatically functions to provide flipper fabric of the desired length.

Another object is to provide apparatus for bead flipper forming machines which automatically measures the length of flipper fabric necessary for the bead flipper being formed.

Another object is to provide apparatus for bead flipper forming machines which functions during the operation of the flipper forming machine for automatically measuring and cutting the flipper fabric to the proper length for a given diameter of bead flipper.

These being among the objects of the present invention, the same consists of certain methods of operation, features of construction, and combinations of parts to be hereinafter described with reference to the accompanying drawings, and then claimed, having the above and other objects in view.

In the drawings which illustrate one suitable embodiment of the present invention:

Fig. 4 is an enlarged perspective view of the machine showing a bead flipper thereon which has been completely formed with the exception of a small portion at one end that is to be lapped over the other end to form a splice.

Fig. 5 is a vertical section through the folding rolls.

Fig. 6 is an enlarged fragmentary elevation of the folding rolls showing the fabric in the process of being folded around the bead core.

Fig. 9 is a diagonal section taken substantially on the line 9—9 of Fig. 7 clearly showing the forming rolls and their mounting.

Fig. 10 is an elevational view of the bevel gear bracket.

Fig. 11 is an enlarged fragmentary portion of Fig. 9 showing the construction of one of the forming rolls in detail.

Fig. 12 is an elevation of Fig. 11 looking toward the end of the swingable roll housing.

Fig. 13 is a transverse section of the forming roll taken on the line 13—13 of Fig. 11.

Fig. 14 is an enlarged vertical section of the fabric measuring device taken on the line 14—14 of Fig. 15.

Fig. 15 is an end elevation of the measuring device shown in Fig. 14.

Fig. 16 is a section similar to Fig. 14 showing the position of the parts thereof at the time of cutting the fabric to measured length.

Fig. 17 is a vertical section taken substantially on the line 17—17 of Fig. 16.

A bead flipper for pneumatic tire casings comprises a core consisting of a plurality of steel wires formed into a ring and preferably enclosed by a fabric covering, and a strip of fabric called a "flipper strip" folded around the core with one edge or flap of the fabric overlapping the other. The extending folds or flange formed by the overlapped flaps of the bead flipper extend into and form a part of the walls of the tire carcass. When the flipper is in assembled position in the tire carcass, the flange of the flipper assumes a frusto-conical position, or in other words, has a dished appearance.

It is, therefore, the aim of the present invention to provide a new and novel apparatus whereby bead flippers can be produced easily and economically, and whereby the flipper fabric is automatically measured during the forming operation and automatically cut to proper length.

Figure 1:
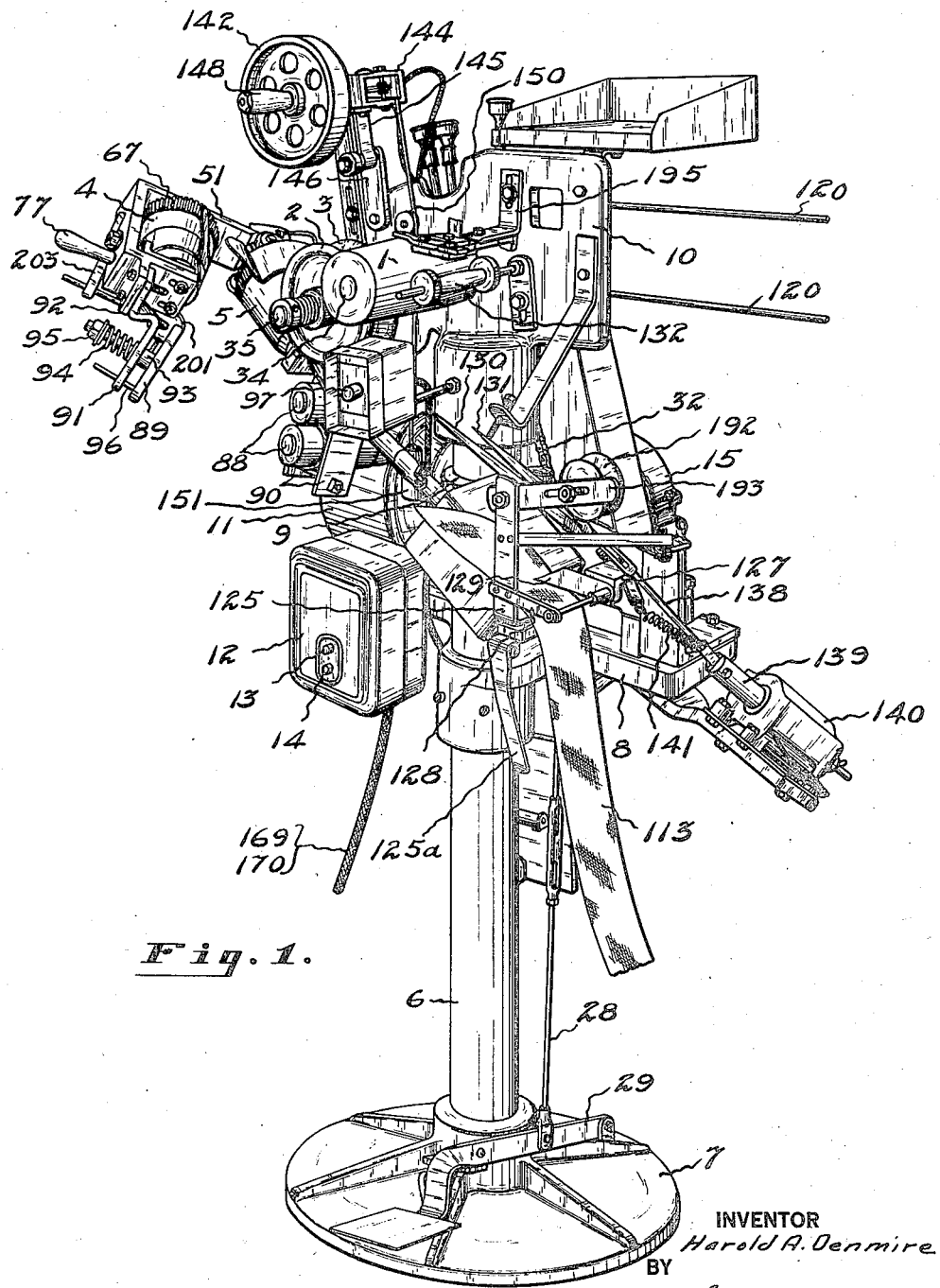
Figure 1 is a perspective view of the machine for forming bead flippers, as viewed from the operator's side.
Figure 2:
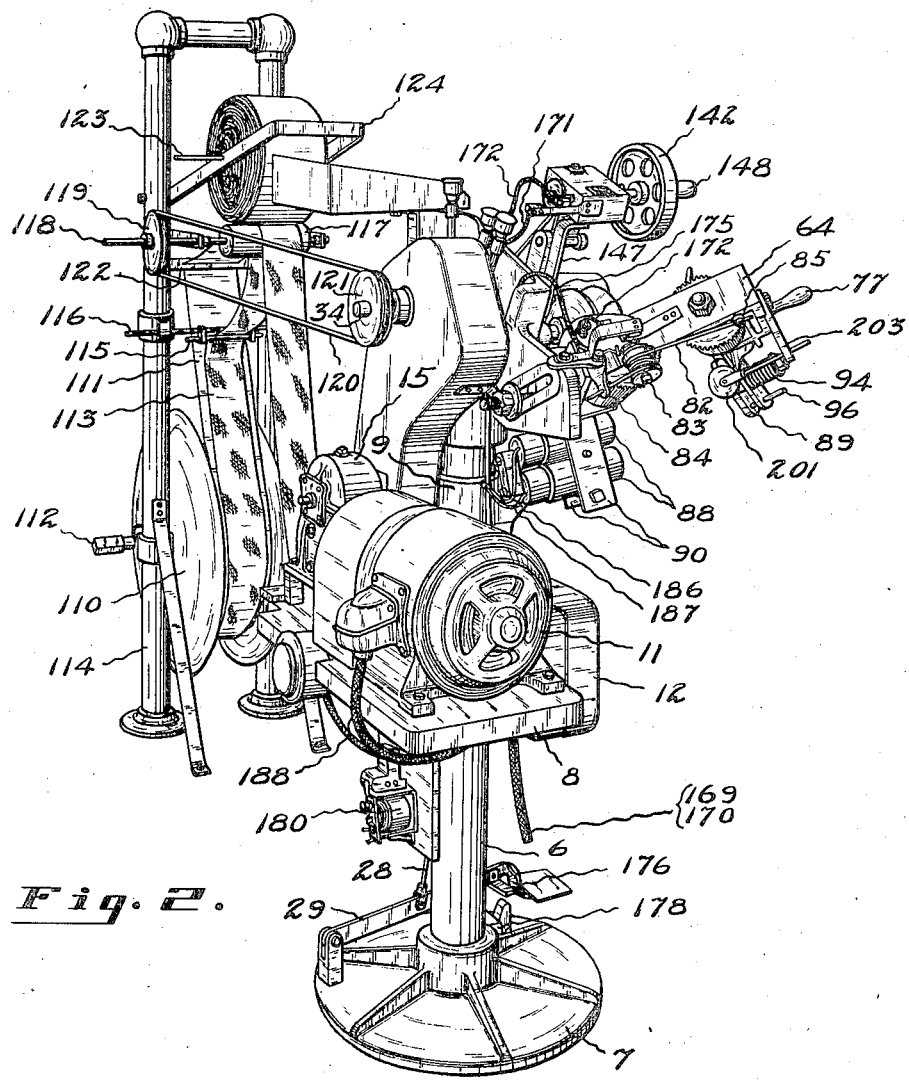
Fig. 2 is a perspective view of the machine shown in Fig. 1, as viewed from the rear, showing the method of feeding fabric stock to the same.

Referring to the accompanying drawings in which like numerals refer to like parts throughout the several views, and particularly to Figs. 1, 2 and 4, the apparatus used for forming the bead flippers principally comprises a feed roller 1, fabric folding rolls 2 and 3, forming rolls 4 and 5, and suitable gearing for operating these devices.

The entire structure is supported by a column 6 having a base 7, upon which is mounted a motor support 8, a gear bracket 9 and a roll supporting bracket 10. Power for operating the apparatus is supplied by a motor 11 supported on the base 7 and controlled from a starter switch 12 which is provided with the usual start and stop buttons 13 and 14 respectively.

Figure 7:
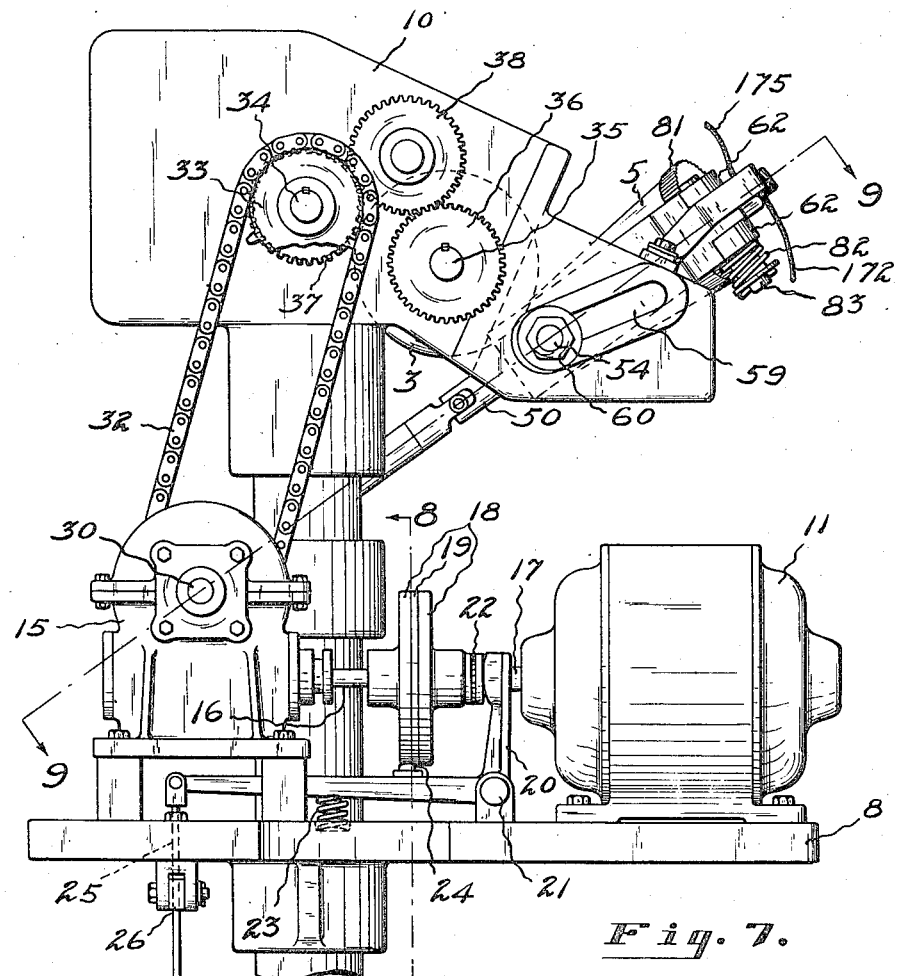
Fig. 7 is a partial enlarged rear elevation of the machine, having parts removed to show the driving mechanism.
Figure 8:
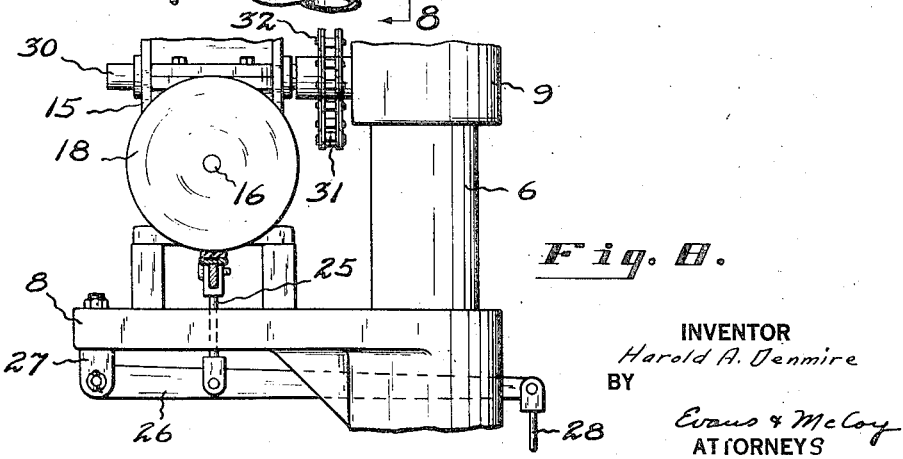
Fig. 8 is a vertical section taken substantially on the line 8—8 of Fig. 7.
Figure 18:
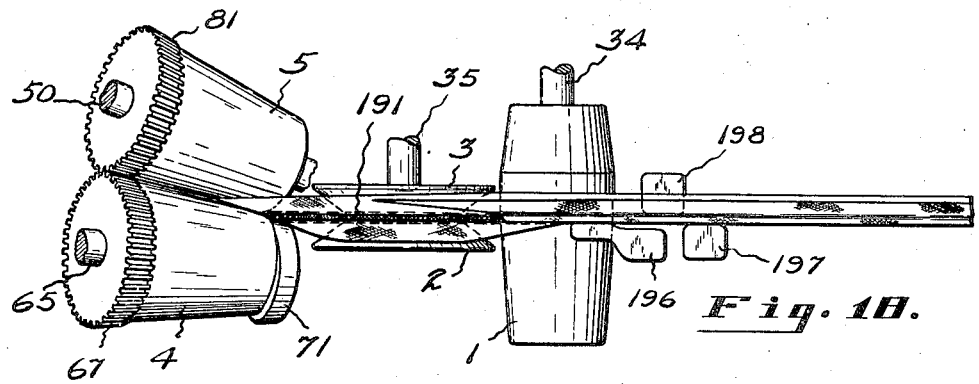
Fig. 18 is a plan view showing the relation of the feed, folding and forming rolls in respect to a bead flipper being formed.

Referring to Figs. 7, 8 and 9, a housing 15 containing suitable reduction gears (not shown) is mounted upon the motor support 8 with the drive shaft 16 thereof in axial alignment with the drive shaft 17 of the motor 11. The shafts 16 and 17 are each provided with a section 18 of a clutch coupling, and a friction pad 19 is positioned between the coupling sections 18 to transmit power from the motor shaft 17 to the reduction gear drive shaft 16. A bell crank 20 is pivoted by means of a pin 21 to the motor base 8 and has one arm thereof in engagement with a thrust bearing 22 carried by the coupling section 18 mounted upon the motor shaft 17. A compression spring 23 is mounted between the other bell crank arm and the motor support 8 to normally force a brake pad 24 into engagement with the coupling section 18 mounted upon the reduction gear drive shaft 16. The last mentioned bell crank arm is pivoted at its end to one end of a rod 25 extending downwardly through the motor base 8, the other end of the rod 25 being pivoted to a horizontal lever bar 26 intermediate its ends. One end of the bar 26 is hinged to a bracket 27 attached to the motor base 8 and the other end thereof is pivoted to a vertical rod 28 which is connected to a foot pedal 29 hinged to the supporting base 7, as shown in Fig. 1. When the operator of the machine depresses the foot pedal 29 the bell crank 20 is pivoted through the medium of the linkage just described so that the brake pad 24 is moved away from the coupling section 18 mounted on the shaft 16 and the upwardly extending bell crank arm forces the coupling section on the motor shaft 17 to compress the friction pad 19 into rigid engagement with the coupling section on the shaft 16, thereby causing the reduction gearing drive shaft to be driven by the motor 11. Thus the power is transmitted at reduced speed from the motor to the reduction gearing driven shaft 30 to drive the mechanism for forming the flipper bead. A drive sprocket 31 is secured to the shaft 30 and drives a driven sprocket 33 through the medium of a link chain 32, which sprocket 33 is secured to a shaft 34 that extends horizontally through the roll supporting bracket 10 and is rotatably supported therein on suitable bearings (not shown). The shaft 34 extends through the bracket 10 to the operating side of the machine to drive the feed roll 1 which is secured thereto. The feed roll 1 as shown in Fig. 18 is cylindrical for a portion of its length and is frusto-conical for the remainder thereof, and extends outwardly from the bracket 10. The feed roll 1 feeds fabric into folding rolls 2 and 3 at a definite speed, the operation of which will be described later in the specification.

The folding rolls 2 and 3 are mounted upon a shaft 35, parallel to the shaft 34, which extends through the bracket 10 to the rear side thereof and has a spur gear 36 mounted thereon which is driven by a spur gear 37 mounted on the shaft 34, through the intermediary of an auxiliary idler gear 38. The idler gear 38 is provided so that the feed and folding rolls will rotate in the same counter-clockwise direction as viewed in Fig. 4.

The folding roll 3 is mounted on the shaft 35 so that it can be adjusted longitudinally of the same, and is provided with a set screw 98 threaded into the hub thereof which is adapted to engage the shaft so that the roll 3 can be set in any predetermined position. This roll is formed with a frusto-conical outwardly presenting face 99 and with a cylindrical recess 99a concentric with the face 99. The folding roll 2 is slidably mounted on the shaft 35 and is likewise formed with a frusto-conical face 101, presenting toward the face 99 of the roll 3, and with a cylindrical recess 102 concentric with the face 101. The rolls 2 and 3 as shown in Fig. 5 face each other to provide a V-shaped notch therebetween, and the openings 102 and 99a therein telescopically receive the ends of a bead driving cylinder 100. The folding roll 2 normally abuts against the cylinder 100 and is held in abutting relationship therewith by means of a compression spring 105, one end of which engages the end of the hub of the roll 2 and the other end of which engages a collar 106 securely mounted on the end of the shaft 35. The roll 2 is driven by means of a pin 103 extending transversely of the shaft 35, which engages the side walls of the transverse notches 104 formed in the hub of the roll 2.

It can be seen that the pin 103 provides a positive driving means for the roll 2 and still allows sliding movement of the same longitudinally of the shaft 35. The frusto-conical faces 99 and 101 of the folding rolls 2 and 3 form a V-shaped groove around their circumference, the bottom of which does not come to a point, but has a supplementary groove 107 of rectangular shape, defined by the smaller diametered base 108 of the roll 2, the surface of the bead driving cylinder 100 and the smaller diametered base 109 of the roll 3. The width of the groove 107 will, of course, vary, depending upon the relative positions of the rolls 2 and 3 on the shaft 35. The main purpose of the spring 105 is to force the roll 2 toward the roll 3 so that sufficient tractive effort is exerted on the core, or core and fabric, to hold the fabric around the inner and side faces of the core and to form the fabric into a V-shape as shown in Fig. 6. The primary function of the cylinder 100 is to provide a positive driving means for the bead core and fabric folded therearound. This forming action will be more fully described later in the specifications. The shape of the groove 107 does not necessarily have to be rectangular, but may be of any desired shape, this of course, depending upon the shape of the bead core used in the bead flipper.

The shaft 30 which carries the sprocket 31 is journaled in the reduction gearing housing 15 and gear bracket 9, and a bevel gear 39 is secured to the end of the same opposite the housing 15. This gear 39 meshes with a similar gear 40 secured to an inclined shaft 41 journaled in a U-shaped housing 42. The housing 42 is formed with an opening between the sides thereof through which the shaft 30 extends, and the gear 39 abuts against the web of the housing to prevent end play of the same, but with sufficient clearance so that the housing may be rotated about the shaft 30 as an axis. The gear bracket 9 is formed with an integral projecting quadrant 43 having a slot 44 therein, substantially as shown in Fig. 10 through which a pin 45 threaded into the rear web face of the housing 42 extends. A nut 46 is threaded on the end of the pin 45 so that the housing 42 can be clamped to the gear bracket 9. Upon loosening the nut 46, the housing can be rotated through a substantial arc to vary the angular position of the shaft 41. As shown in Fig. 9, one end of the shaft 41 projects beyond the housing 42 and is connected by a universal joint 47 to one end of an extensible shaft 48. The other end of the shaft 48 is universally connected by a joint 49 to the end of the shaft 50 to which the forming roll 5 is secured. The ends of the roll shaft 50 are journaled in the legs of a U-shaped roll housing 51, the housing being supported at one end by a semi-flexible strap 52 secured to the roll supporting bracket 10. The other end of the housing 51 is formed with a circular opening 53 through which the head of a bolt 54 extends. A pin 55 fixed in the head of the bolt 54 perpendicular to the axis thereof engages the inner surfaces of the web of the housing 51. A semi-spherical boss 56 is located on the outer surface of the housing 51 adjacent the opening 53 and which is co-axial with the pin 55. A collar 57 having a recess therein to receive the boss 56 is mounted upon the bolt 54, and the plane side thereof engages a nut 58 threaded on the bolt 54. The bolt 54 extends through a slot 59 in the roll supporting bracket 10 and is held in adjusted position by nuts 60 and 61. By loosening the nuts 60 and 61 and the nut 58, it is evident that the roll housing may be universally moved within certain limits about the axial intersection of the bolt 54 and pin 55.

Extending outwardly from one end of the housing 51 are hinge lugs 62 cooperating with the lugs 63 on the roll housing 64 so that the housing 64 is hingedly attached to the housing 51. The housing 64 is similar in shape to the housing 51 and carries the other forming roll 4. As shown in Figs. 9, 11 and 13, a stub shaft 65 is secured to the hinged leg of the housing 64 by means of nuts 66. The frusto-conical forming roll 4 having a bevel gear 67 secured to the large end thereof by bolts or screws 68 is rotatably mounted on the stub shaft 65, and is held in position thereon by the enlarged head 69 of the shaft 65 and a spacer washer 70. An auxiliary forming roll 71 is rotatably mounted on a short stub shaft 72 carried by a slide 73 slidably engaging the inner face of the unhinged leg of the housing 64. The slide 73 is also provided with a pin 76 which extends into a hollow handle 77 secured to the web of the housing 64, a compression spring 78 being provided in the hollow handle 77 to bear against the pin 76. The auxiliary roll 71 as shown in Figs. 9 and 11 bears against the small diametered end face of the roll 4, and has a plurality of circular openings 79 therein presented toward the end face of the roll 4. A plurality of driving pins 80 having the same spacing as the openings 79 are secured to the small diametered end of the roll 4 to project into the openings 79.

The driving pins 80 are much smaller in diameter than the circular recesses 79 into which they extend, and consequently allow the auxiliary roll 71 to rotate eccentrically relative to the forming roll 4. The axes of the rolls 4 and 71, however, remain parallel. It is evident that for any amount of eccentricity, the auxiliary roll 71 will rotate at the same speed as the roll 4 because of the engagement of the driving pins 80 with the walls of the circular openings 79. The slide 73 is held in sliding contact with the adjacent leg of the housing 64 by cap screws 86 which move in slots 87 formed in the leg of the housing. The bolts 86 and pin 74 being movable in the slots 87 and 75 respectively permit lateral movement of the axis of the auxiliary roll 71 in the plane of the axes of the rolls 4 and 5. This movement, however, is resisted by the spring 78 positioned in the handle 77. The roll 4 is driven from the forming roll 5 by means of a bevel gear 81 mounted on the roll 5 which meshes with the bevel gear 67 when the roll housings 64 and 51 are in closed position, and because the gears have the same pitch diameters, the rolls 4 and 5 will rotate at the same relative speeds. When the roll housings are in closed position, the fabric of the bead flipper is positioned under tension between the roll 5 and auxiliary roll 71 substantially as shown in Fig. 9, the core being of greater thickness than the fabric, therefore forces the auxiliary roll 71 to assume an eccentric position against the pressure of the spring 78.

A torsion spring 82 is coiled around an extension of the hinge pin 83 which pivots the roll housing 64 to the housing 51 and has one end fixed in a member 84, as shown in Fig. 2, attached to the roll housing 51, the other end of the spring 82 being seated against a stud 85 carried by the roll housing 64. This spring 82 maintains the forming rolls 4 and 5 in open position as shown in Fig. 1.

Figure 3:
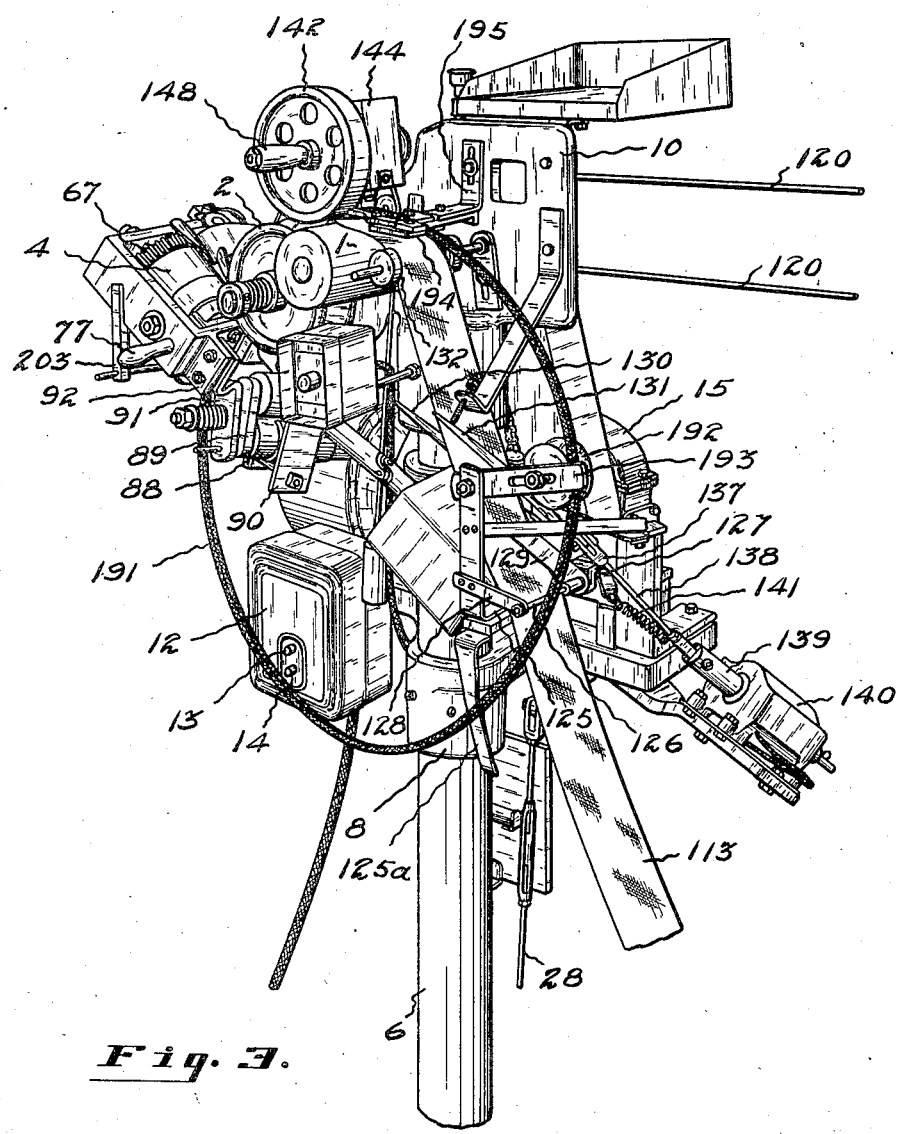
Fig. 3 is an enlarged perspective view of the machine showing the bead core in position ready to have the fabric covering folded around the same.

The roll housing 64 is held in operating position against the torsion of the spring 82 by the action of electro-magnets 88 with an armature 89 as shown in Figs. 1, 3 and 4, the electromagnets being mounted on the roll supporting bracket 10 by clamping arms 90, and the armature 89 being yieldably mounted on an arm 91 carried by a lug 92 formed on the roll housing. The armature 89 as more clearly shown in Fig. 1, is carried by a stud 93 extending through an opening in the arm 91, and has a spring 94 thereon compressed by a nut 95 threaded on the end of the stud 93. The nut 95 may be threaded inwardly or outwardly to adjust the pressure of the spring 94. A pin 96 carried by one end of the armature 89 slidably extends through the arm 91 to prevent rotation of the armature 89.

The electro-magnets 88 are positioned in such a manner that when the roll housing 64 is manually moved to closed position and when the electromagnets are energized, the armature 89 is attracted by the electromagnets 88 and makes contact therewith. Since the armature is yieldably mounted on the arm 91, pressure is exerted by the forming roll 4 against the roll 5 as previously mentioned.

A push button switch 97 is inserted in the electric circuit to close the same for energizing the electro-magnets, so that when it is opened by depressing the button thereof, the electromagnets are de-energized thereby releasing the contact with the armature 89. The torsion spring 82 then causes the roll housing 64 to swing to open position.

Referring to Fig. 2, the fabric 113 forming the flipper strip is supplied to the machine in a continuous strip wound around a spool 110, and between each layer on the spool is a continuous strip or separator 11 to prevent the surfaces of the same which are frictioned, from sticking together.

The spool 110 for the fabric 113 is supported on a shaft 112 rotatably mounted on a frame 114. The fabric as it is being unwound from the spool 110 passes between two spindles 115 and 116 carried by the frame 114, the purpose of which is to separate the fabric 113 from the canvas separator strip 111. The fabric then passes over a roller 117 which is secured to a shaft 118 having a pulley 119 thereon which is rotated by and connected by a belt 120 to a pulley 121 secured to the shaft 34, so that when the machine is in operation the roller 117 is rotated to supply fabric to the bead flipper machine as fast as it is used. The canvas separator 111 after it is stripped from the fabric 113 passes upwardly through a narrow slot in a bar 122 and is then wound around a shaft 123 journaled in a floating frame 124 pivoted at its ends to the main frame 114, the frame 124 being arranged so that the roll of canvas thereon contacts with the moving fabric as it passes over the roller 117. Thus, the separator strip is caused to be rolled up as fast as it is unwound from the spool 110.

The fabric 113 as it passes over the roller 117 then moves between a bracket 125 and a spindle 126, as shown in Figs. 3 and 4, which is journaled in a bearing 127 secured to the motor base 8, and an arm 128 secured to the bracket 125. A dog 129 having a sharp pointed end is pivoted to the spindle 126 so that the pointed end thereof bears against the fabric 113 and prevents the same from pulling away from the machine when a length is sheared off in the machine. The fabric 113 then passes from the bracket 125 to a guide roller 132 rotatably mounted on the roll support 10, but before reaching the roller 132 it passes between shear blades 130 and 131 which are set at an angle to cut the fabric diagonally as in common practice, and so as not to touch the fabric passing therethrough except when operated to cut the same. The shear blade 131 is fixed at one end to a bracket (not shown) carried by the motor base 8 and is steadied at its point by a set screw 133 threaded in a bracket 134 attached to the roll support bracket 10. The other shear blade 130 is pivoted intermediate its ends to the blade 131 by a pin 135 and the one end is attached as illustrated diagrammatically in Fig. 21 to an arm 136 which is pivoted to a clevis 137. The clevis 137 is secured to a rod 138 which is attached to the plunger core 139 of an electrically operated solenoid 140 carried by the motor base 8. A tension spring 141 attached to the plunger core 139 and the motor base 8 withdraws the plunger core from the solenoid when it is deenergized, thus holding the shear blades 130 and 131 in normal inoperative position.

The device for measuring the amount of fabric necessary for each flipper bead comprises a wheel 142 which is caused to rotate by its contact with the core of the bead flipper as it is moved, and which is arranged to actuate electrical contacts in order to energize the solenoid 140. Energizing the solenoid 140 causes the plunger core 139 to be drawn thereinto which operates the shear blades 130 and 131 to cut the fabric to the desired length. This measuring device is best described with reference to Figs. 1, 14, 15, 16 and 17. The wheel 142 is pinned to a shaft 143 freely rotatable in a frame 144 which is of box-like construction and attached to an arm 145 pivoted to a bracket 146 secured to the roll support bracket 10, as shown in Fig. 1.

The arm 145 is so located that the frame 144 can be lowered by swinging the same to engage the wheel 142 with the core of the flipper bead. An adjustable rest 147 is located in such a position that it will support the frame 144 in its uppermost inoperative position, that is, the frame 144 is swung upwardly and over until a vertical line through its center of gravity falls to the rear of the bracket 146. This position is indicated in Fig. 1. The shaft 143 carries a handle 148 which may be grasped by the operator to raise and lower the measuring device. A pulley 149 is mounted on the shaft 143 within the frame 144, and wound around the same is a band 150 having a weight 151 attached to its free end. This band is wound on the pulley 149 in such manner that the weight 151 is raised when the measuring wheel 142 revolves in a clockwise direction, as viewed in Fig. 3, that is, when the fabric is being measured. When the measuring device is raised to inoperative position as shown in Fig. 1, the weight 151 descends, unwinding the band 150 from the pulley and bringing the measuring wheel to its original starting position. A contactor bar 152 is slidably mounted in the frame 144 and has a slot 153 cut therein to receive a rectangular plate 154. This plate 154 is formed with a slot 155 through which a pin 156 and screw 157 extend so that the plate may be longitudinally adjusted to various positions within the slot 153, the pin 156 and screw 157 being carried by the bar 152. The ends of the pin 156 extend beyond the sides of the bar 153 to engage slots 158 formed in the ends of a pair of complemental levers 159 pivoted on a single bolt 160 to the frame 144. These levers 159 are arranged on the sides of the shaft 143 and are formed with pins 161 positioned on a plane passing through the axis of the shaft 143 to engage a spiral groove or thread 162 formed on the shaft 143. The pins 161 cooperate with the thread 162 to rotate the levers 159 through a small arc, thus moving the bar 152 longitudinally as the measuring wheel revolves. A stop 163 is located on the wheel 142 to engage the end of the bar 152 when the wheel is in its starting position. A cam 164 is secured to the end of shaft 143 beyond the bearing at that end to engage the plate 154 when the bar 152 has been moved a predetermined distance by the levers 159. The bar 152 carries a contactor 165 mounted on an insulating block 166 at its end adjacent to the cam 164. A semi-flexible arm 167 is secured to the frame 144 and likewise carries a contactor 168 adapted to cooperate with the contactor 165. The cam 164, upon rotation by the shaft 143, raises the bar 152 when the cam engages the plate 154 to cause the contactor 165 to engage the contactor 168 and thereby close the electric circuit to energize the solenoid 140, so that the shears 130 and 131 will cut the fabric to the desired length. Suitable adjustments may be made by moving the plate 154 longitudinally of the bar 152 and by rotating the cam 164 relative to the shaft 143 so that different lengths of fabric may be cut for different sizes of bead flippers.

Figure 21:
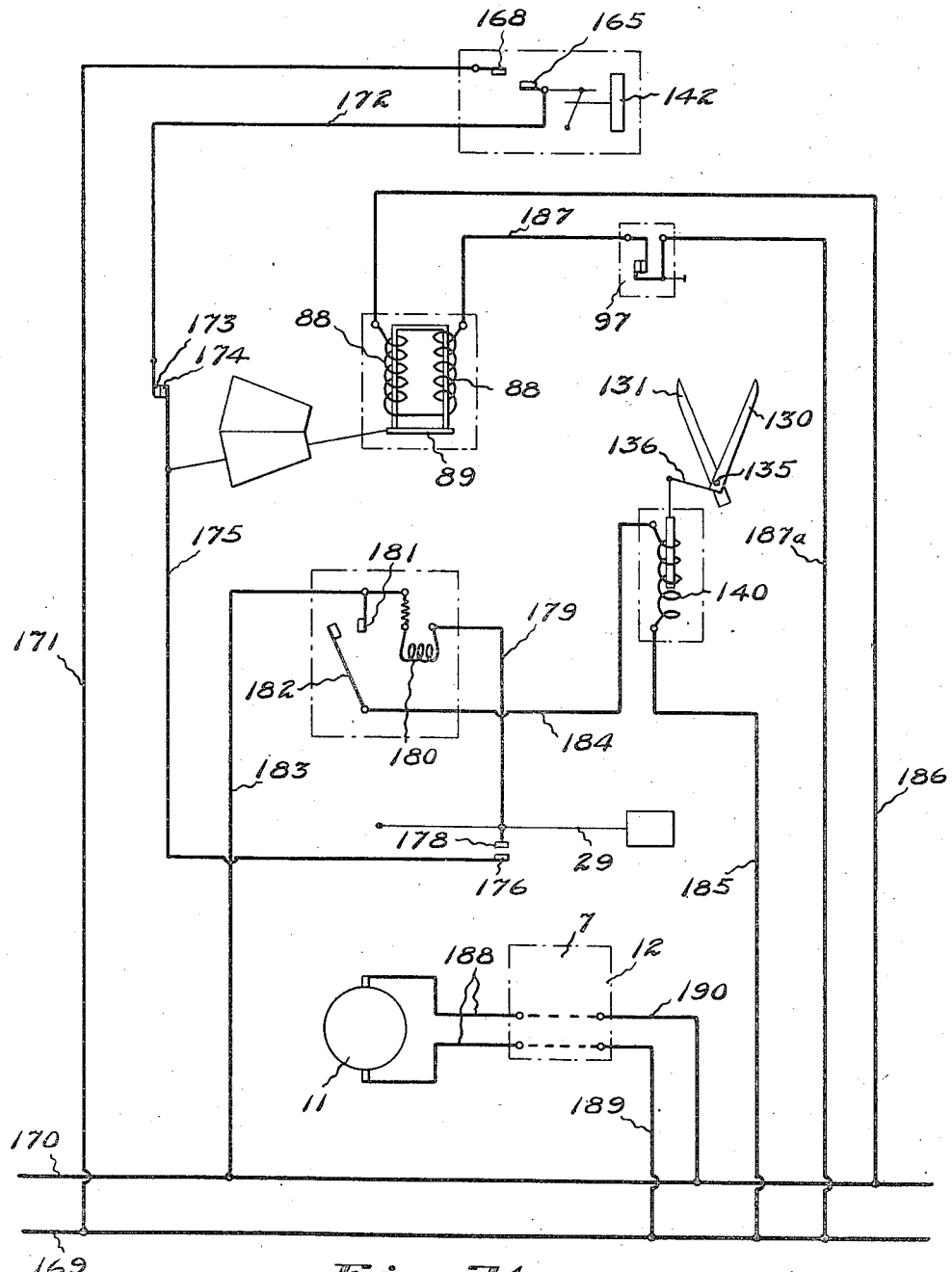
Fig. 21 is a schematic diagram of the electrical circuit used in the bead flipper machine.

Fig. 21 illustrates the wiring diagram for the electrical equipment of the machine.

The motor 11 furnishes a constant source of power to operate the several rolls and feeding devices which only operate when the foot pedal 29 is depressed. The push button 97 provides an additional control to release the forming rolls 4 and 5. A suitable system of interlocks and relays eliminates the possibility of damaging the machine or material used.

The direct current for operating the solenoids and electromagnets is supplied by lines 169 and 170. One circuit leads from main line 169 through conductor wire 171 to the contactor 168 of the measuring device, through the contactor 165 to the conductor wire 172 which leads to the contactor point 173 located on the roll supporting bracket 10 shown in Fig. 9. This circuit then leads from the other contactor 174 on the forming roll housing 64 through conductor wire 175 to the contact 176 carried by the foot pedal 29 shown in Figs. 1 and 21, which contact 176 cooperates with contact 178. The contact 178 is connected by conductor wire 179 to the relay coil 180 having contactors 181 and 182. The relay coil 180 is connected by conductor 183 to the main line 170 thus completing this circuit. This circuit, just described, functions only when the measuring wheel 142 causes the contactors 165 and 168 to meet, and in order to function, the forming rolls 4 and 5 must be in closed position to engage the contactors 173 and 174, and the foot pedal 29 must be depressed to close the circuit by engaging the contactors 176 and 178. Closing of this circuit in the manner just described causes direct current to flow through the relay coil 180 and energize the same, causing the breaker points 181 and 182 to engage each other and close another circuit to operate the shear blades 130 and 131 to cut the fabric. This circuit comprises a conductor wire 184 leading to one terminal of the solenoid 140 for operating the shear blades, and the other terminal is connected to the main power line 169 by a conductor 185 to close the circuit.

A further circuit is provided which consists of a conductor 186 connecting the main power line 170 with the electromagnets 88, a conductor 187 connecting the electromagnets with the push button switch 97, and a conductor wire 187a leading from the switch 97 to the main power line 169 to complete the circuit. The motor 11 is connected to the starter 12 by lead wires 188 which in turn is connected to the main power lines 169 and 170 by conductors 189 and 190 respectively.

In order not to complicate the drawings, no attempt has been made to show all the wiring just described on the assembly views of the machine. It is believed that the diagram shown in Fig. 21 clearly illustrates the electric circuits employed.

Several of the parts of the machine have not been described, as yet, but will be fully described in the description of the operation of forming the bead flipper which is to follow.

When the machine is in position to operaate, and it has the appearance illustrated in Fig. 1, the fabric 113 being held by the sharp pointed dog 129, the roll housing 64 being held in open position by the torsion spring 82, and the measuring wheel 142 being in its uppermost position. The operator first inserts the continuous core 191 of the flipper bead in the machine by placing the same over the feed roll 1 and in the groove 107 between the folding rolls 2 and 3. The core 191 is also seated within the groove of a supporting guide pulley 192 rotatably mounted on an arm 193 carried by the bracket 125, the center of the groove therein being directly in line with the groove 107 formed by the folding rolls 2 and 3. A downwardly extending guard 125a is secured to the bracket 125 to prevent contact of the core 191 with the fabric 113. When the core is in position as shown in Fig. 3, it is also supported by a guide and drag comprising a plate 194 secured to an adjustable arm 195 attached to the roll support 10. This plate 194 supports a pair of adjustable guide blocks 196 and 197 to prevent the core 191 from working outwardly on the roll 1, and an adjustable guide block 198 spaced from the blocks 196 and 197 to engage the other side of the core 191 to prevent the same from working inwardly on the roll 1, thus accurately gauging the path of the core over the feed roll 1. The block 198 can be moved toward the blocks 196 and 197 to frictionally engage the core with the result that the peripheral speed of the same may be retarded, the object of which will be apparent later. The positions of the guide blocks 196, 197 and 198 relative to the feed roll 1 and folding rolls 2 and 3 is best shown in Fig. 18, although the position of the core 191 is best shown in Fig. 3. The inner edge of the core also seats against the forming roll 5.

The next step of the operator is to swing the roll housing 64 into closed position. The circuit leading to the electromagnets 88 is, of course, closed and the same are energized so that as soon as the roll housing 64 is swung into position the armature 89 is attracted by the electromagnets 88, with the result that the rolls 4 and 5 are held in closed operating position with the auxiliary forming roll 71 in engagement with the outer side of the flipper bead core 191.

The operator then places the fabric or flipper strip in starting position by passing it between the shear blades 130 and 131, and running it over the guide spool 132 and the feed roll 1 underneath the bead core 191 in such position that the core 191 is intermediate the marginal edges thereof. The measuring device is swung into operating position by dropping the wheel 142 so that it rides on the bead core 191 directly over the feed roll 1. The operator then steps on the pedal 29 to engage the clutch plates 18 so that the feed, folding and forming rolls are caused to rotate through the medium of the gearing previously described.

Figure 19:
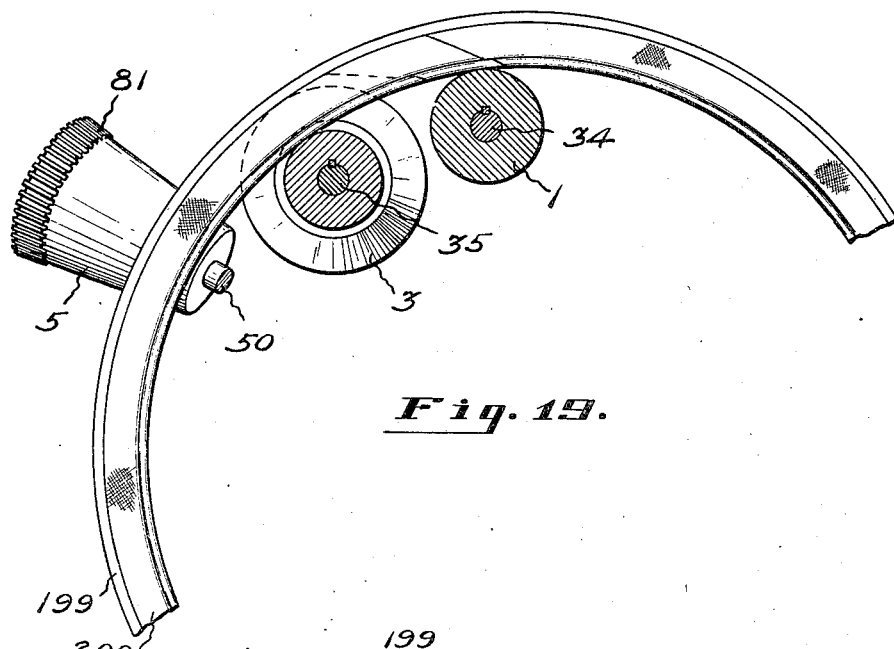
Fig. 19 is a partly sectioned front elevation of the feed, folding and forming rolls shown in Fig. 18.

In Figs. 4, 18 and 19 the folding and forming action of the various rolls is illustrated. Operation of the machine causes the bead core and fabric to rotate about an imaginary center somewhere about the extended apex of the conical forming rolls and the first movement of the same causes the fabric to be folded around the sides and inner edge of the core as it passes between the folding rolls 2 and 3 and enters the forming rolls 4 and 5. The auxiliary roller 71 firmly presses the fabric and core therein against the folding roll 5 under considerable pressure and therefore provides a driving means for the core 191. The gearing is so arranged that the peripheral speed of the rolls 4, 5 and 71 adjacent to the core 191 positioned therein is the same as the peripheral speed of the portions of the folding rolls 2 and 3 adjacent to the core 191. The diameter of the cylindrical portion of the feed roll, however, is slightly greater than the diameter of the bead driving cylinder 100 so that the peripheral speed of the same is slightly more than the peripheral speed of the cylinder 100. The result is that the fabric 113 on the way to the folding rolls 2 and 3 travels at a higher rate of speed than the peripheral speed of the core 191. The guide blocks 196, 197 and 198 exert friction on the core 191 greater than the adhesion between the fabric and core so that the core will not be caused to travel at the same speed as the fabric adjacent the fabric feed roll 1. The fabric 113, as it leaves the roll 1 at a faster speed than the core, assumes a V-shape and the sides thereof lie against the inclined faces 99 and 101 of the folding rolls 2 and 3.

The forming rolls 4 and 5 as previously described are frusto-conical in shape and revolve about axes which meet at a point remote from the imaginary center of rotation of the core 191, and are also positioned so that a plane passing through the adjacent faces of the same is inclined to the vertical, that is, this plane is not perpendicular to the axes of the rotating shafts 30, 34 and 35, or the axis of the rotating core. It is evident then, that as the diameters of the forming rolls 4 and 5 are increased, the peripheral speeds are increased. The speed of the edges of the fabric passing between the rolls 4 and 5 is, therefore, greater than the speed of the fabric folded around the core, and is also greater than the speed of all portions of the fabric passing through the folding rolls. The result is readily apparent, as it can be seen that the fabric is stretched in an angular direction, and is stretched an increasingly greater amount as the diameter of the same is increased. It is desirable that the fabric be stretched a maximum amount at the points of greatest diameter, so that the flange formed by the engaged flaps 199 and 200 of the flipper strip will assume a frusto-conical appearance and will not distort.

The auxiliary forming roll 71, being in an eccentric position, together with the edge of the roll 4, completes the folding operation by wrapping the fabric around the outer edge of the core 191, leaving two flaps 199 and 200 which, when pressed together by the rolls 4 and 5, adhere to each other, and because these flaps are stretched a maximum amount at their outer edges they retain the shape they had while passing between the rolls 4 and 5. That is, they assume the shape illustrated in Fig. 20, the flaps being inclined downwardly toward the core 191.

By the time the bead flipper is about three quarters formed, the slide bar 152 of the measuring device is moved sufficient distance for the cam 164 to engage the plate 154 and move the same to engage the contactors 165 and 168 to close the circuit. As soon as the circuit is closed the relay is energized to close the contactors 181 and 182. This then causes current to flow through the solenoid, which, as previously described, operates the shear blades 130 and 131 to cut the fabric. The machine continues in operation until the fabric is completely formed around the core. The operator overlaps the end of the fabric as it moves over the feed roll, with the starting end of the same to form an even splice. He does not, however, remove his foot from the pedal 29 until the spliced ends of the fabric have passed through the forming rolls 4 and 5. Immediately under the forming rolls is a supplementary roller 201, which gives an additional dished effect to the bead flipper. This roller 201 is fixed to a pin 202 carried by an adjustable holder 203 which is mounted on the roll housing.

Figure 20:
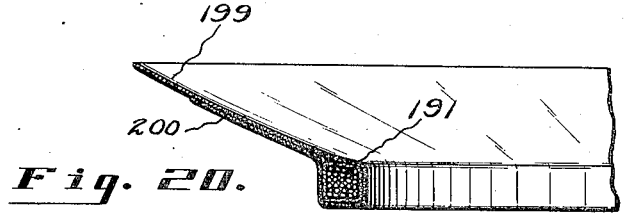
Fig. 20 is a transverse section through a completely formed bead flipper.

As soon as the spliced ends of the fabric have passed through the forming rolls 4 and 5 the operator removes his foot from the pedal 29, which opens the circuit by disengaging the terminal contactors 176 and 178. He then pushes the button switch 97 to open that circuit which deenergizes the electromagnets 88. The magnets 88 then release the armature 89 and the torsion spring 82 swings the roll housing 64 to open position. The measuring device is then moved to its uppermost position so that the completely formed bead flipper can be removed from the machine. The flipper bead in its completely formed condition has a dished or frusto-conical appearance as shown in Fig. 20. The flipper bead is then ready to be assembled to a tire carcass. It can be readily seen that the bead flipper will retain its finished frusto-conical shape because the fabric folds 199 and 200 have been stretched to a maximum at their points of largest diameters. The advantages are evident, as they can not flex out of their inclined position because the fabric has been stretched to a maximum.

Although the present invention is illustrated and described in connection with a particular bead forming machine that is shown and specifically described and claimed in my copending application Serial No. 513,836, filed February 6, 1931, it is to be understood that the same is equally applicable to other flipper forming machines.

Furthermore, it is to be understood that the particular form of apparatus used, and the particular procedure set forth, are presented for purposes of explanation and illustration and that various modifications of said apparatus and procedure can be made without departing from the spirit and substance of the broad invention, the scope of which is commensurate with the appended claims.

What I claim is:

1. In an apparatus for forming bead flippers, the combination with means for feeding a flipper strip to a rotatable bead core, of a measuring device engageable with said rotatable bead core adjacent to said feeding means and a cutting device controlled by said measuring device to automatically cut said flipper strip to a predetermined length.

2. In an apparatus for forming bead flippers, the combination with means for feeding a flipper strip to a rotatable bead core, of a rotatable member engageable with the bead core and arranged to be rotated thereby, a cutting member for cutting the flipper strip and means controlled by the position of said rotatable member for operating said cutting member to thereby cut the flipper when a predetermined quantity is fed to said bead core.

3. In an apparatus for forming bead flippers, the combination with means for feeding a flipper strip to a rotatable bead core, of means for cutting the flipper strip when a predetermined quantity thereof is fed to said bead core, said last mentioned means comprising a rotary member engageable with and arranged to be rotated by the bead core, a cutting member adjacent the flipper strip, electrically operated means for actuating said cutting member, and means controlled by said rotary member for setting said electrically operated means in operation.

4. In an apparatus for forming bead flippers, the combination with means for feeding a flipper strip to a rotatable bead core, of means for cutting the flipper strip when a predetermined quantity thereof is fed to said bead core, said last mentioned means comprising a rotary member engageable with and arranged to be rotated by the bead core, a cutting member adjacent the flipper strip, a solenoid for actuating said cutting means having a source of electrical energy connected therewith, and a switch means for breaking the flow of electrical energy to said solenoid, said switch means being opened and closed by said rotary member.

5. In an apparatus for forming bead flippers, the combination with means for feeding a flipper strip to a rotatable bead core, of means for cutting the flipper strip when a predetermined quantity thereof is fed to said bead core, said last mentioned means comprising a rotary member engageable with and arranged to be rotated by the bead core, a cutting member adjacent the flipper strip, a solenoid for actuating said cutting means having a source of electrical energy connected therewith, switch means for breaking the flow of electrical energy to said solenoid, and a rotatable cam rotated by said rotary member for opening and closing said switch means.

6. In an apparatus for forming bead flippers, the combination with means for feeding a flipper strip to a rotatable bead core, of means for cutting the flipper strip when a predetermined quantity thereof is fed to said bead core, said last mentioned means comprising a rotary member engageable with and arranged to be rotated by the bead core, a cutting member adjacent the flipper strip, a solenoid for actuating said cutting means having a source of electrical energy connected therewith, and a means for breaking the flow of electrical energy to said solenoid, said means comprising a stationary contact member, a movable contact member, and a rotatable cam rotated by said rotary member for moving said movable contact member into engagement with said stationary contact member.

7. In an apparatus for forming bead flippers, the combination with means for feeding a flipper strip to a rotatable bead core, of means for cutting the flipper strip when a predetermined quantity thereof is fed to said bead core, said last mentioned means comprising a rotary member engageable with and arranged to be rotated by the bead core, a cutting member adjacent the flipper strip, a solenoid for actuating said cutting means having a source of electrical energy connected therewith, and a means for breaking the flow of electrical energy to said solenoid, said means comprising a stationary contact member, a movable contact member normally disposed away from said stationary contact member, means controlled by said rotary member for moving said movable contact member to a position adjacent said stationary contact member, and means also controlled by said rotary member for moving said movable contact member into direct engagement with said stationary contact member.

8. In an apparatus for forming bead flippers, the combination with means for feeding a flipper strip to a rotatable bead core, of means for cutting the flipper strip when a predetermined quantity thereof is fed to said bead core, said last mentioned means comprising a rotary member engageable with and arranged to be rotated by the bead core, a cutting member adjacent the flipper strip, a solenoid for actuating said cutting means having a source of electrical energy connected therewith, and a means for breaking the flow of electrical energy to said solenoid, said means comprising a stationary contact member, a movable contact member normally disposed well away from said stationary contact member, a longitudinally movable bar supporting said movable contact member, a rotatable shaft secured to said rotary member and having spiral screw threads thereon, a pivoted bar engaged with said first bar and having a follower engaged with said screw threads whereby said longitudinally movable bar may be moved during rotation of said rotary member to position said movable contact member adjacent to said stationary contact member, and a cam on said shaft arranged to move said movable contact member into engagement with said stationary contact member.

In testimony whereof I affix my signature.

HAROLD A. DENMIRE.